Patented Dec. 13, 1938

2,140,380

UNITED STATES PATENT OFFICE 2,140,380

ROTARY MOTION TRANSMITTING SYSTEM

Herbert Gawehn, Frohnau, Germany, assignor to General Electric Company, a corporation of New York Application March 8, 1938, Serial No. 194,709
In Germany April 2, 1937

7 Claims. (Cl. 177—351)

My invention relates to a method and system of transmitting rotary motion and is suitable for the telemetering of the indications of delicate measuring instruments where the moving element of such instrument is directly connected to and moves the rotor element of a transmitter of the generator type.

Heretofore it has been considered impracticable to use a transmitter of the generator type and drive its rotor directly by the moving element of the conventional low torque measuring instrument because such arrangements would seriously interfere with the accuracy of the measuring instrument. This difficulty is avoided according to my invention by reason of the fact that I employ a method of operation which consists in first positioning the rotor of the transmitter according to a measurement when such rotor is deenergized, second I lock the transmitter rotor in position and then energize the telemetering system. I then deenergize the telemetering system and again free the transmitter rotor so that it may take up a new position according to the measurement to be transmitted and repeat this sequence of operations intermittently. The positioning of the transmitter by the measuring instrument and the transmission of the measurement position to a distant point are thus accomplished separately as consecutive operations in a way that assures very high accuracy of both operations. This will be more fully explained in connection with the accompanying drawing, in which Fig. 1 represents a rotary position telemetering system to which my invention has been applied. Figs. 2 and 3 represent modified forms of locking relays, Fig. 4 an end view of a locking relay, Figs. 5 and 6 voltage wave forms of a character that may be used to advantage for energizing the system, and Fig. 7 is a modified form of rotor which may be used in the transmitting and receiving devices.

Referring now to Fig. 1, 10 and 11 represent transmitting and receiving stations respectively. At the transmitting station, there is a delicate measuring instrument, the rotary element of which is represented by the needle 12 mounted on a shaft 13. Also mounted on shaft 13 is the rotary element 14 of a transmitter. This element may consist of a light-weight single phase coil without iron in its construction. 15 diagrammatically represents the stator element of the transmitter. It may consist of a conventional three phase wound stator surrounding the rotor coil 14. At the receiving station or stations there is provided a receiver consisting of a stator element 16 and rotor element 17 which are preferably similar to corresponding parts of the transmitter. The receiver rotor is mounted on a shaft 18 to which is connected a pointer 19. The stator elements are connected by the three wire transmitting circuit 20, and the rotor elements receive excitation from a source of supply 21 over a single phase circuit 22. It will now be understood that when the rotor elements of the telemetering system are energized by alternating current or by a current having an alternating or pulsating component, they will tend to align themselves in the same angular positions with respect to their stator elements. If the rotors 14 and 17 are in angular agreement no current is generated in the three wire stator circuit. If, however, the rotors are not in angular agreement, circulating currents will be generated in the three wire stator system, producing a torque on the rotor elements tending to bring them into angular agreement.

In prior continuously energized systems operating on this general principle, it has been necessary to position the rotor of the transmitter with a motor or by hand or by a measuring instrument having such high torque characteristics as to move the rotor against the torque of the transmitting system. That is, in order to transmit rotary movement from the transmitter to receiver, the rotor of the transmitter must be first turned to generate a circulating current in the three phase system which in turn produces a corrective turning torque on the receiver or receivers. Hence, any measuring instrument used for directly turning the rotor of the transmitter with the system energized must be a very high torque instrument, else the added torque imposed upon it for turning the rotor of the transmitter would result in a serious error in its measurement.

This limitation of prior systems is overcome by means of the present invention. I provide any suitable device such as a commutator 23 driven by a motor 24 which may be energized from source 21 for periodically interrupting the energizing circuit 21 of the telemetering system and I provide a relay 25 for locking the rotor of the transmitter from movement when the telemetering system is energized. During the period when the telemetering system is deenergized, the light rotor of the transmitter is free to be positioned in accordance with the measurement of the measuring instrument. Not only is the transmitter free of any torque in the transmitter at this time but it is also free of the friction of any brushes or resistance to movement imposed by flexible leads which are used to convey excitation to the transmitter rotor when it is energized.

2. A telemetering system including electrical transmitters and receivers effective to transmit rotary motion when the system is energized and without torque when deenergized, the transmitter having a rotary part which is rotatively positioned in accordance with the indication to be transmitted, means for periodically energizing and deenergizing said system, means for locking the rotary part of said transmitter against rotation only when said system is energized and means for positioning said rotary part in accordance with an indication to be transmitted when it is unlocked.

3. A telemetering system including electrical transmitters and receivers effective when the system is energized to transmit rotary motion and without torque when the system is deenergized, the transmitter having a rotary part which is rotatively positioned in accordance with the indication to be transmitted, an electric relay device so connected to said system as to be energized and deenergized with the system and effective, only when energized, to lock the rotary part of the transmitter against rotation, means for alternately energizing and deenergizing said system, and means effective to position the rotary part of said transmitter in accordance with an indication to be transmitted when such part is unlocked.

4. In a telemetering system, an electrical transmitter having a rotary part, a winding on said rotary part, collector rings rotatable with said winding and relatively stationary brushes normally spaced from said rings, but movable into contact therewith for the purpose of energizing said winding and a relay connected in parallel with said brushes and effective when energized to force said brushes in contact with the collector rings to lock the rotary part of the transmitter against rotation and a measuring instrument for rotatively positioning the rotary part of said transmitter in accordance with an indication to be transmitted when said rotary part is unlocked.

5. In a telemetering system, a transmitter comprising a rotary shaft, a measuring instrument having a rotary part secured to said shaft, an electrical rotary motion transmitter having a rotary winding part secured to said shaft, collector rings constituting the terminals of said winding secured to said shaft, a pair of brushes normally spaced from said collector rings but movable into contact with said collector rings in order that said winding may be energized therethrough, an electric relay device connected in parallel with said brushes, which relay when energized is effective to press said brushes against said collector rings with sufficient force as to lock the shaft against rotation, said brushes contacting with said collector rings in such manner as to minimize forces tending to displace said shaft due to such contact.

6. A telemetering system comprising rotary motion transmitting and receiving devices, each having stator and rotor windings, a three-wire circuit connecting the stator windings together, a source of supply having an alternating current component, a circuit for energizing the rotor windings of said devices from said source, means for alternately opening and closing said energizing circuit, a relay energized from said circuit for locking the rotor winding of the transmitting device against rotation when the relay is energized, and a sensitive measuring instrument for rotatively positioning the rotor winding of said transmitting device when it is unlocked.

7. In a telemetering system having electrical rotary motion transmitting and receiving devices, the method of operation which consists in alternately energizing and deenergizing the system, rotatively positioning the transmitter in accordance with an indication to be transmitted when the system is deenergized and locking the transmitter against rotary motion during the time the system is energized.

Feb. 28, 1939.   N. E. METHLIN   2,148,954
ELECTRIC TELE-INDICATOR DEVICE
Filed July 13, 1934   3 Sheets-Sheet 1
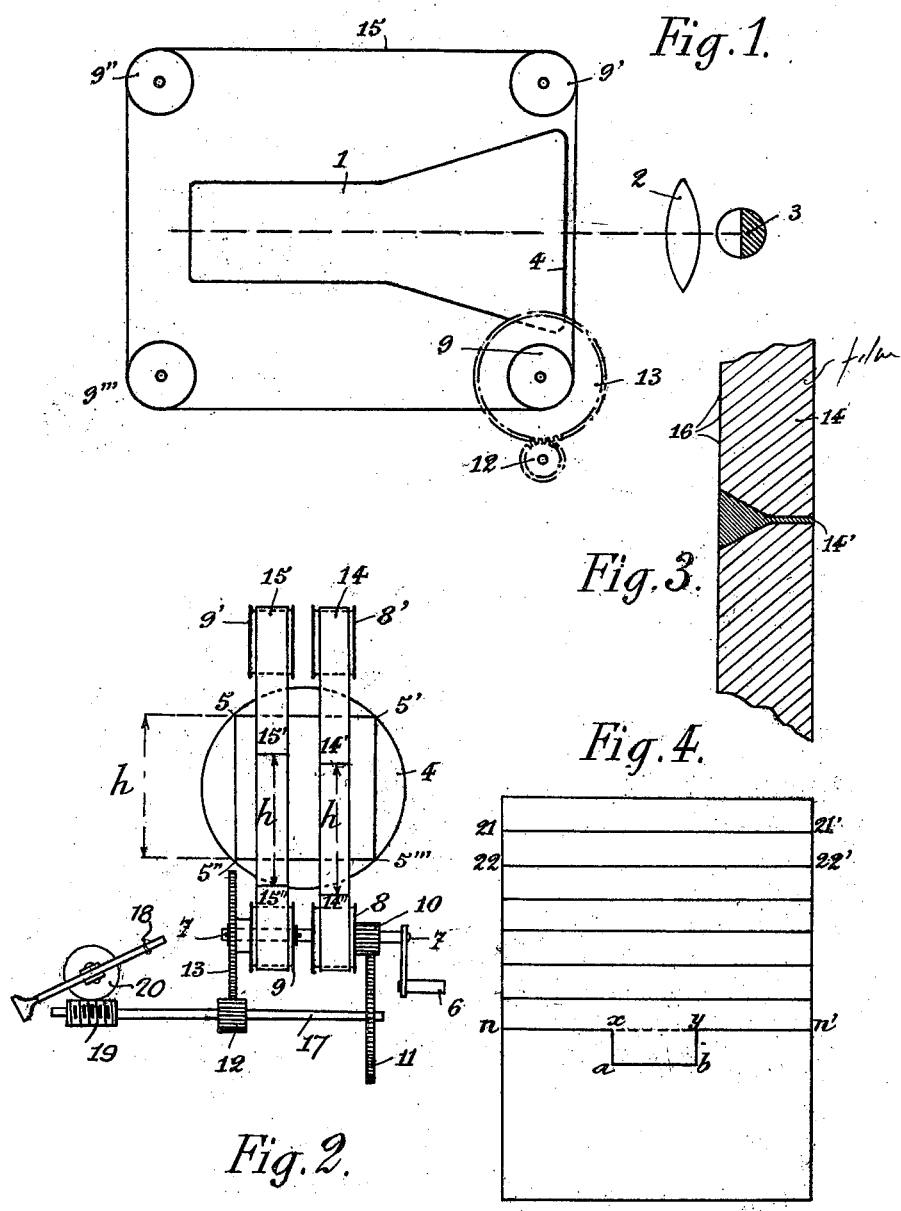

HERBERT GAWEHN.